United States Patent [19]

Moghaddam et al.

[11] Patent Number: 5,710,833
[45] Date of Patent: Jan. 20, 1998

[54] DETECTION, RECOGNITION AND CODING OF COMPLEX OBJECTS USING PROBABILISTIC EIGENSPACE ANALYSIS

[75] Inventors: Baback Moghaddam; Alex Pentland, both of Cambridge, Mass.

[73] Assignee: Massachusetts Institute of Technology, Cambridge, Mass.

[21] Appl. No.: 425,579

[22] Filed: Apr. 20, 1995

[51] Int. Cl.$^6$ .................... G06K 9/00; G06K 9/62; G06K 9/52; G06K 9/74

[52] U.S. Cl. .................... 382/228; 382/118; 382/206

[58] Field of Search .................... 382/118, 228, 382/248, 205, 210, 203, 206

[56] References Cited

U.S. PATENT DOCUMENTS

| | | | |
|---|---|---|---|
| 4,259,661 | 3/1981 | Todd | 382/205 |
| 4,752,957 | 6/1988 | Maeda | 382/206 |
| 4,838,644 | 6/1989 | Ochoa et al. | 382/210 |
| 4,998,286 | 3/1991 | Tsujiuchi et al. | 382/165 |
| 5,101,446 | 3/1992 | Resnikoff et al. | 382/248 |
| 5,111,516 | 5/1992 | Nakano et al. | 382/203 |
| 5,164,992 | 11/1992 | Turk et al. | 382/118 |
| 5,245,675 | 9/1993 | Ferre et al. | 382/205 |
| 5,432,864 | 7/1995 | Lu et al. | 382/118 |

FOREIGN PATENT DOCUMENTS

| | | | |
|---|---|---|---|
| 8900461 | 11/1989 | WIPO | G06F 15/20 |
| 9101183 | 2/1992 | WIPO | G06K 9/46 |
| 9100775 | 5/1992 | WIPO | G06K 9/66 |

OTHER PUBLICATIONS

Kirby et al., 12 *IEEE Trans. on Pattern Analysis and Machine Intelligence* 103 (1990).

Kumar et al., 21 *Optical Engineering* 043 (1982).

*Primary Examiner*—Andrew Johns
*Assistant Examiner*—Monica S. Davis
*Attorney, Agent, or Firm*—Cesari and McKenna, LLP

[57] ABSTRACT

Methods and apparatus for detecting instances of a selected object or object feature in a digitally represented scene utilize analysis of probability densities to determine whether an input image (or portion thereof) represents such an instance. The invention filters images of objects that, although in some ways similar to the object under study, fail to qualify as typical instances of that object. The invention is useful in the detection and recognition of virtually any multifeatured entity such as human faces, features thereof (e.g., eyes), as well as non-rigid and articulated objects such as human hands.

20 Claims, 4 Drawing Sheets

DETECTION, RECOGNITION AND CODING OF COMPLEX OBJECTS USING PROBABILISTIC EIGENSPACE ANALYSIS

This invention was made with government support under Grant Number NSF-9205668-IRI awarded by the National Science Foundation. The government has certain rights in the invention.

FIELD OF THE INVENTION

This invention relates to automatic visual learning, and in particular to analysis of digitally represented images to detect, recognize and encode various types of complex, multifeatured entities such as human faces.

BACKGROUND OF THE INVENTION

Visual learning systems encode observed scenes into digital representations and analyze these representations for some purpose. One important purpose involves scanning a scene for the presence of certain types or categories of objects, then performing further analysis on detected objects to identify or at least further classify them. This application of visual learning has found recent use in systems that detect and identify faces for security, law enforcement, border control or other purposes.

The analysis requires techniques of pattern recognition that are capable of systematically characterizing the patterns of interest and discriminating within relatively large sets of data. Some of the most successful techniques are statistical in nature. To carry out these operations on raw data (i.e., scenes digitally represented as grids of picture-element points, or "pixels"), however, would be computationally prohibitive. Instead, the data are typically transferred into a systematic representation appropriate to the analysis to be undertaken. One technique of pre-analysis data processing is the Karhunen-Loeve transformation ("KLT"), which involves an eigenvalue and eigenvector analysis of the covariance matrix of the data to provide a representation amenable to statistical analysis (see, e.g., Kirby et al., 12 *IEEE Transactions on Pattern Analysis and Machine Intelligence* 103 (1990)). More specifically, objects are represented within very large coordinate space in which each pixel of the object corresponds to a spatial dimension, so that objects correspond to vectors (or points) in that space. In accordance with the KLT, a training set, or ensemble of images of the entity under study is subjected to mathematical transformations that represent the training images as eigenvectors of the ensemble's covariance matrix. Each of the original training images can be represented exactly as a weighted sum of the eigenvectors.

Such eigenspace decompositions, while potentially more powerful than standard detection techniques such as template matching or normalized correlation, still present a formidable computational burden if estimation techniques are to be applied to the high-dimensional space of the imagery. To analyze the data efficiently, it must be partitioned so that the search can be restricted to the most salient regions of the data space. One way of identifying such regions involves "principal components analysis" ("PCA"), which recognizes that the distribution of objects within the multidimensional image space tends to be grouped within a characteristic region, and utilizes the principal components of the eigenvectors to define this region. The eigenvectors each account for a different amount of variation among the training set of images, and can be thought of as a set of features which together characterize the modes of variation among the images. Each vector corresponding to an object image contributes more or less to each eigenvector. Each object image can be approximately represented by linear combinations of the "best" or principal component eigenvectors (i.e., those with the largest eigenvalues), which account for the most variance within the set of training images.

In U.S. Pat. No. 5,164,992 (the entire disclosure of which is hereby incorporated by reference), for example, this formulation is used in a face-recognition system wherein the principal components define a principal subspace, or "face space" region of the high-dimension image space in which the training images cluster. Input images (or image regions) are scanned to detect the presence of faces by mathematically projecting the images onto face space. The distance of an input image (represented in as a point in the high-dimensional image space) from face space is utilized to discriminate between face and non-face images; that is, if the computed distance falls below a preselected threshold, the input image is likely to be a face. More generally, it can be said that the technique described in the '992 patent utilizes the "distance-from-object-space" ("DFOS") quantity to determine whether an input image contains an instance of the object.

While computationally tractable, the approach of the '992 patent is fundamentally incomplete, since eigenvectors other than the principal components are discarded in defining the object space. The resulting partial density function treats the object space as a monolithic whole; the DFOS metric provides an absolute distance from a space presumed to have no internal variation. However, in assuming that all patterns in the object space are equally likely, this analysis is prone to certain false conclusions. For example, a pattern sharing particular similarities with the training images but which the human eye would instantly recognize as a non-instance of the object can easily, using the DFOS obtained from PCA, be miscategorized as a member of the object class.

The limited manner in which object space is defined using PCA imposes limitations not only if the object space varies in density, but also if it is multimodal. For example, suppose the training images comprise photographs of faces taken at different view angles or under different illumination conditions. The distribution of training views in face space will not be unimodal; in fact, it will tend to lie on complex and non-separable low-dimensional manifolds in object space. PCA cannot provide accurate estimates within such a spatial topology. To adapt PCA to such multimodal environments, one must resort to expedients such as building a view-based (or object-based) formulation wherein PCA is carried out in separate eigenspaces, each corresponding to a different view, or attempting to capture the complexity of the object-space manifolds in a universal or parametric eigenspace using splines or local basis functions. Any of these adaptations is complex, however, and may ultimately degrade the accuracy of the analysis.

DESCRIPTION OF THE INVENTION

Summary of the Invention

The present invention provides an approach to object detection and recognition that effectively utilizes all eigenvectors, not just the principal components, to derive estimates. The invention captures the probability distribution within object space instead of assuming that all patterns within that space are equally likely. In this way, the invention facilitates finer distinctions among patterns, deriving, for an input image falling within object space, a measure of its typicality within that space. In other words, if a pattern lies within object space but nowhere near the region of that space where the training images tend to cluster, the invention identifies the pattern as "atypical" and probably not a member of the object class. The invention is useful in the detection and recognition of virtually any multifeatured entity such as human faces, features thereof (e.g., eyes), as well as non-rigid and articulated objects such as human hands.

Because the invention is not limited in its analysis to the principal eigenvector components, it readily accommodates multimodal distributions. In practice, so long as it is provided with a set of training images representative of the different object views, the invention is able to provide worthwhile recognition performance over a range of input pattern orientations. In other words, the invention is capable of discriminating within an object space that is not only non-uniform, but also multimodal in internal distribution. Furthermore, the invention can operate over a range of scales, so that detection is largely independent of the size of a characteristic pattern within the input image.

The representations utilized by the present invention lend themselves to highly efficient model-based encoding, functioning, in effect, as a form of data compression. A set of basis eigenvectors representative of the class of objects can be used as the basis for encoding new objects, which are expressed as weighted linear combinations of the basis vectors. In this way, a new object can be represented using a small number of bytes, facilitating efficient encoding of large image databases with a minimum of required storage. Compression can be further enhanced by quantizing.

In one aspect, therefore, the invention is a facility for detecting complex, multifeatured objects or entities (such as faces) in cluttered scenes in accordance with the principles described herein. A scanning module systematically identifies rectangular neighborhoods of pixels and passes to a detection module a value (e.g., brightness level) associated with each pixel. The detection module expresses the pixel values as a vector in high-dimensional image space (with the pixel values corresponding to the lengths of vector components along each spatial axis), and projects this vector onto an eigenspace decomposition as described hereinafter to determine whether the vector contains a pattern characteristic of the type of object to be detected (i.e., whether it not only falls within object space but is also typical); if so, a recognition module determines whether the input pattern corresponds to any particular one of a set of training images. More specifically, the invention extends the PCA approach so that an input image is considered against all eigenvector components of a training set of images, but without the computational demands of an explicit analysis throughout the high-dimensional image space. Instead, the invention builds upon the subspace results of PCA, treating them as an estimate of a marginal component of the probability density of an object in image space, and achieves a complete estimate of the probability density by separately incorporating the PCA projection and a projection of the input image onto the remaining (non-principal) eigenvectors in a statistically consistent estimation framework. This represents a key element of the invention, since the probability densities associated with principal-component and remaining eigenvector spaces need not correlate with one another.

In addition to whole-object detection, the invention can be implemented to automatically detect and identify object features (e.g., facial features instead of an entire face). This function represents an individuation of what would, on a whole-object basis, represent modular object-space densities. For convenience of explanation, the term "feature" is generically used herein to connote an entire object or a feature thereof.

In another aspect, the invention provides, as an adjunct or alternative to detection, a model-based encoding of the object or of particular object features based on linear combinations of eigenobject or eigenfeature templates (e.g., eigenfaces, eigeneyes, eigennoses, eigenmouths, etc.). In an eigenfeature representation, the complete probability, whose marginal component is equivalent distance-from-feature-space ("DFFS") metric is used to build, from analysis of each pixel of an input image, a feature distance-map. When using n eigenvectors, this requires n convolutions (which can be efficiently computed using fast Fourier transform ("FFT") hardware or software) plus an additional local energy computation. The global minimum of this distance map is then selected as the best feature match. The performance of this technique was recently tested on a database of approximately 8,000 "mugshot" photographs, with which it achieved a 94% detection rate (representating an improvement of about a full order of magnitude over standard template matching).

The invention also embodies apparatus for automatic visual learning, featuring detection and identification of objects using maximum-likelihood ("ML") analysis, which provides a statistical basis for combining probabilities within and outside the principal-component space. In preferred embodiments, the apparatus includes means for scanning an image at multiple scales and performing an ML analysis (at the object or feature level, or both) at each scale, preferably in parallel, to detect instances of target features; means for representing a training set of images, preferably consistent in orientation and illumination, as a set of eigenvectors in multidimensional image space; means for adjusting detected components of the input image for geometric and gray-scale contrast consistency with the training images set; means for projecting the detected features onto the eigenspace representation of the training set for purposes of recognition; an optional reconstruction module for reconstructing the original image components in terms of eigenvector projection coefficients; and an encoding module for efficiently representing the adjusted and/or reconstructed image components as sets of quantized eigenvector projection coefficients.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENTS

1. Image Analysis

The approach of the present invention is based on density estimation, and utilizes an eigenspace decomposition to reduce a high-dimensional image space to a computationally manageable subspace. The problem can be stated with respect to a set of training images $\{x^t\}_{t=1}^{N_t}$ each a member of an object class $\Omega$: the invention estimates the class membership or likelihood function $P(x|\Omega)$, i.e., that an input image x is a member of the class.

Figure 1:
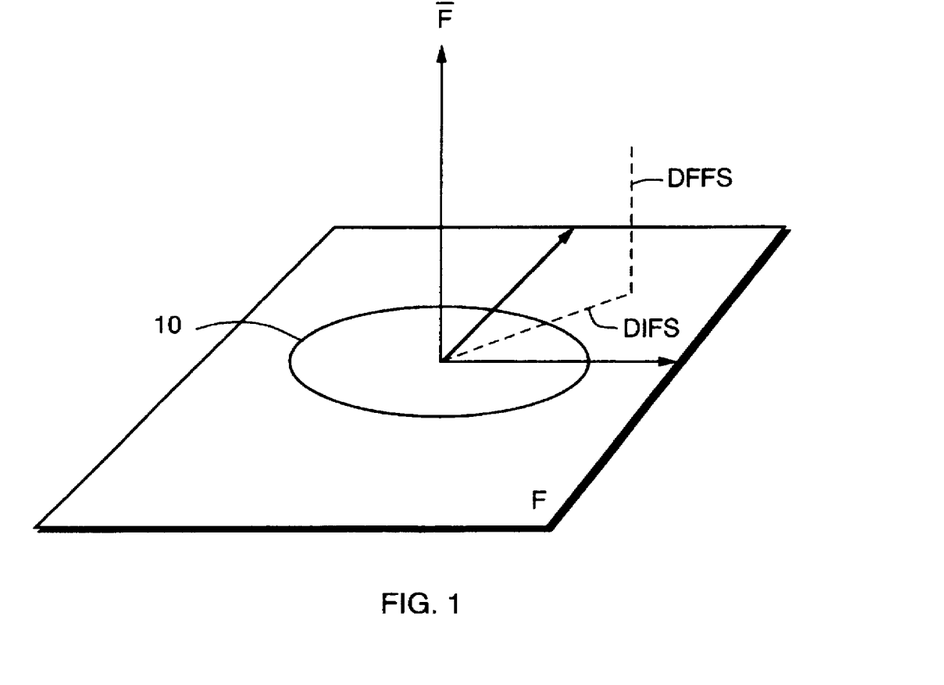
FIG. 1 is a representation of a feature or object in a principal subspace containing the principal components in a unimodal distribution and an orthogonal subspace containing the remaining components.

The standard PCA approach is as follows. Given a set of m-by-n images $\{I\}_{t=1}^{N_t}$ it is possible to form a training set of vectors $\{x^t\}$, where x is of dimension mn (i.e., $x \in R^{N=mn}$), by lexicographic ordering of the pixel elements of each image $I^t$. The basis functions in a KLT are obtained by solving the eigenvalue problem $$\Lambda = \Phi^T \Sigma \Phi \tag{1}$$

where $\Sigma$ is the covariance of the data, $\Phi$ is the eigenvector matrix of $\Sigma$ and $\Lambda$ is the corresponding diagonal matrix of eigenvalues. Using PCA, a partial KLT is performed to identify the largest-eigenvalue eigenvectors and obtain a principal component feature vector $y = \Phi_M^T \tilde{x}$, where $\tilde{x} = x - \bar{x}$ is the mean-normalized image vector and $\Phi_M$ is a submatrix of $\Phi$ containing the principal eigenvectors. PCA can be described as a linear transformation $y = T(x): R^N \to R^M$ which extracts a lower-dimensional subspace of the KL basis corresponding to the maximum eigenvalues (i.e., the principal components). As shown in FIG. 1, which, for explanatory purposes, presumes representation and analysis at the feature (as opposed to object) level, this corresponds to an orthogonal decomposition of the vector space $R^N$ into two mutually exclusive and complementary feature subspaces: the principal subspace (or feature space) $F = \{\Phi_i\}_{i=1}^M$, a hyperplane containing the principal components clustered within a region 10; and the remaining components, represented in FIG. 1 by the orthogonal complement $\bar{F} = \{\Phi_i\}_{i=M+1}^N$. The distance-from-feature-space ("DFFS") quantity represents, for an input image x, the distance of its image-space vector from the principal feature subspace F; techniques such as that employed in the '992 patent assess whether the DFFS lies within a predetermined error range, and if so, the input image is considered an instance of the feature. In other words, the space $\bar{F}$ is used only to calculate residual reconstruction error. Ignored are the relationship of x to relevant feature vectors lying in $\bar{F}$ space, as well as the distance of the projection of x in the principal feature space F from the cluster 10 of principal vectors; this latter "distance-in-feature-space" ("DIFS") parameter indicates the degree whether x qualifies as a typical member of the feature type under study, since the most typical features will fall within or near region 10.

In a partial KL expansion, the residual reconstruction error is defined as $$\epsilon^2(x) = \sum_{i=M+1}^{N} y_i^2 = \|\tilde{x}\|^2 - \sum_{i=1}^{M} y_i^2 \tag{2}$$

where each quantity y represents a projection coefficient onto a component eigenvector (that is, $y_i$ denotes the relative contribution of the ith eigenvector to the input image, and represents a point in F space); the residual error can be straightforwardly computed from the first M principal components and the $L_2$-norm (i.e., the sum of squares, indicative of length) of the mean-normalized image x. With reference to FIG. 1, the DFFS component in the orthogonal subspace $\bar{F}$ is a simple Euclidean distance and is equivalent to this residual error. The DIFS component (i.e., the component of x lying within feature space F) is generally not a distance-based norm, but can be interpreted in terms of the probability distribution of y in F.

Given estimates of the mean $\bar{x}$ and covariance $\Sigma$ of the distribution from the given training set $\{x^t\}$, using, e.g., statistical techniques outlined in the '992 patent, the likelihood function $P(x|\Omega)$ can be expressed as:

$$P(x|\Omega) = \frac{\exp\left[-\frac{1}{2}(x-\bar{x})^T \Sigma^{-1}(x-\bar{x})\right]}{(2\pi)^{N/2} |\Sigma|^{1/2}} \tag{3}$$

(assuming a Gaussian distribution) The sufficient statistic for characterizing this function is the so-called Mahalanobis distance, which provides a multidimensional normalization, i.e., a statistical scaling factor that relates to one another the norms of variables having different value ranges; in this way, "typicality" can be represented consistently for variables that span different values. The Mahalanobis distance is given by $$d(x) = \tilde{x}^T \Sigma^{-1} \tilde{x} \tag{4}$$

where $\tilde{x} = x - \bar{x}$. Using the eigenvectors and eigenvalues of $\Sigma$ it is possible to rewrite $\Sigma^{-1}$ in the diagonalized form $$\begin{aligned} d(x) &= \tilde{x}^T \Sigma^{-1} \tilde{x} \\ &= \tilde{x}^T [\Phi \Lambda^{-1} \Phi^T] \tilde{x} \\ &= y^T \Lambda^{-1} y \end{aligned} \tag{5}$$

where $y = \Phi^T x$ are the new variables obtained by the change of coordinates in a KLT. Because of the diagonalized form, the Mahalanobis distance can also be expressed in terms of the sum $$d(x) = \sum_{i=1}^{N} \frac{y_i^2}{\lambda_i} \tag{6}$$

It is possible to estimate d(x) using only the M principal projections as follows:

$$\begin{aligned} \hat{d}(x) &= \sum_{i=1}^{M} \frac{y_i^2}{\lambda_i} + \frac{1}{\rho} \left[ \sum_{i=M+1}^{N} y_i^2 \right] \\ &= \sum_{i=1}^{M} \frac{y_i^2}{\lambda_i} + \frac{\epsilon^2(x)}{\rho} \end{aligned} \tag{7}$$

where the term $$\sum_{i=M+1}^{N} y_i^2$$

is the DFFS residual error $\epsilon^2(x)$, which can be computed using the first M principal components. Therefore, $P(x|\Omega)$ may be estimated from $\hat{d}(x)$ as the product of two marginal and independent Gaussian densities $$\hat{P}(x|\Omega) = \left[ \frac{\exp\left(-\frac{1}{2} \sum_{i=1}^{M} \frac{y_i^2}{\lambda_i}\right)}{(2\pi)^{M/2} \prod_{i=1}^{M} \lambda_i^{1/2}} \right] \cdot \left[ \frac{\exp\left(-\frac{\epsilon^2(x)}{2\rho}\right)}{(2\pi\rho)^{(N-M)/2}} \right] \quad (8)$$

$$= P_F(x|\Omega)\hat{P}_{\bar{F}}(x|\Omega)$$

where $P_F(x|\Omega)$ is the true marginal density in F-space and $\hat{P}_{\bar{F}}(x|\Omega)$ is the estimated marginal density in the orthogonal complement $\bar{F}$-space.

The optimal value of $\rho$ can be determined by minimizing a suitable cost function $J(\rho)$, which should be the Kullback-Leibler divergence or "relative entropy" between the true density and its estimate:

$$J(\rho) = E\left[ \log \frac{P(x|\Omega)}{\hat{P}(x|\Omega)} \right] \quad (9)$$

Using the diagonalized forms of the Mahalanobis distance $d(x)$ and its estimate $\hat{d}(x)$ and the fact that $E[y_i^2] = \lambda_i$, it follows that $$J(\rho) = \frac{1}{2} \sum_{i=M+1}^{N} \left[ \frac{\lambda_i}{\rho} - 1 + \log \frac{\rho}{\lambda_i} \right] \quad (10)$$

The optimal weight $\rho^*$ can be found by minimizing this function with respect to $\rho$. Solving the equation $$\frac{\partial J}{\partial \rho} = 0$$

yields $$\rho^* = \frac{1}{N-M} \sum_{i=M+1}^{N} \lambda_i \quad (11)$$

which is simply the arithmetic average of the eigenvalues in the orthogonal subspace $\bar{F}$. In addition to its optimality, $\rho^*$ also results in an unbiased estimate of the Mahalanobis distance as follows:

$$E[\hat{d}(x; \rho^*)] = E[d(x)] \quad (12)$$

Accordingly, once an M-dimensional principal subspace is defined (e.g., by PCA), the optimal density estimate $\hat{P}(x|\Omega)$, which encompasses the entire image space and not just the principal subspace, has the form given in Eq. 8, with $\rho$ given by Eq. 11.

Figure 2:
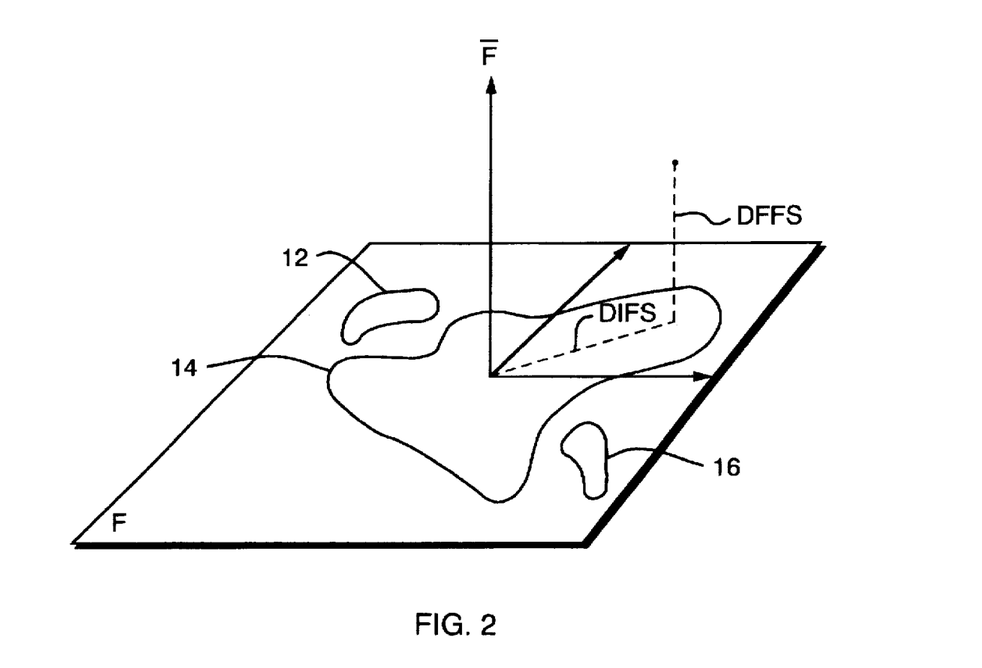
FIG. 2 is a representation of a feature or object in a principal subspace containing the principal components in a multimodal distribution and an orthogonal subspace containing the remaining components.

When the training set represents multiple views or multiple objects under varying illumination conditions, the distribution of training views is no longer unimodal, and may resemble, for example, the arbitrary multimodal density illustrated in FIG. 2. Instead of occupying a single region 10 of space F, the principal vectors occupy a cluster of regions 12, 14, 16. One approach to modeling this type of distribution is to assume that the various regions systematically reflect specific types of image variations (e.g., head-on and left and right profile views), and to partition the analysis by segregating the images into groups.

The present invention also facilitates a unitary analysis of input images in a multimodal eigenvector space without the need for expedients such as partitioning. Assuming the $\bar{F}$-space components are Gaussian and independent of the principal features in F (as would be true in the case of pure observational noise resulting, for example, from "shot noise" inherent in a CCD camera, it is possible still to use the separable form of the density estimate $\hat{P}(x|\Omega)$ in Eq. 8 by treating $P_F(x|\Omega)$ as an arbitrary density $P(y)$ in the principal component vector y. As shown in FIG. 2, the DFFS still corresponds to the residual error $\epsilon^2(x)$, but the DIFS can no longer be represented as a simple Mahalanobis distance. It is possible, however, to represent the DIFS as a "distance" by relating it to $P(y)$—e.g., as DIFS=$-\log P(y)$.

The density $P(y)$ of the principal-component vectors can be estimated using a parametric mixture model. Specifically, arbitrarily complex densities can be modeled using a Mixture-of-Gaussians:

$$P(y|\Theta) = \sum_{i=1}^{N_c} \pi_i g(y; \mu_i, \Sigma_i) \quad (12)$$

where $g(y;\mu,\Sigma)$ is an M-dimensional Gaussian density with mean vector $\mu$ and covariance $\Sigma$, and the $\pi_i$ variables are the mixing parameters of the components, satisfying the constraint $\Sigma \pi_i = 1$. The mixture is completely specified by the parameter $\Theta = \{\pi_i, \mu_i, \Sigma_i\}_{i=1}^{N_c}$. Given a multimodal training set of images $\{y^t\}_{t=1}^{N_T}$ the mixture parameters can be estimated using the ML principle:

$$\Theta^* = \text{argmax} \prod_{t=1}^{N_T} P(y^t|\Theta) \quad (13)$$

This estimation problem is straightforwardly solved using the well-known Expectation-Maximization ("EM") algorithm (see, e.g., Dempster et al., "Maximum Likelihood from Incomplete Data via the EM Algorithm," *Journal of the Royal Statistical Society B*, vol. 39, 1977; and Redner et al., "Mixture Densities, Maximum Likelihood and the EM Algorithm," 26 *SIAM Review* 195 (1984), the contents of each of these references being incorporated by reference). The EM algorithm is monotically convergent in likelihood and is thus guaranteed to find a local maximum in the total likelihood of the training set.

Given the operating assumptions that the training data is truly M-dimensional (at most) and resides solely in the principal subspace F with the exception of perturbations due to white Gaussian measurement noise, or equivalently that the $\bar{F}$-space component of the training data itself represents a separable Gaussian density, the estimate of the complete likelihood function $P(x|\Omega)$ is given by:

$$\hat{P}(x|\Omega) = P(y|\Theta^*)\hat{P}_{\bar{F}}(x|\Omega) \quad (14)$$

where $\hat{P}_{\bar{F}}(x|\omega)$ is a Gaussian component density based on the DFFS, as before.

In both unimodal and multimodal cases, the density estimate $\hat{P}(x|\Omega)$ provides a reliable indication whether an input image (represented as a vector x in image space) represents an instance of the training image set; the estimate reflects both the residual reconstruction error derived from DFFS and the class typicality represented by DIFS. In addition, the density estimate $\hat{P}(x|\Omega)$ also lends itself to images or subimages of different size, so that probability estimates can be developed for image components instead of entire images. In addition, the density estimate can be used to form multiscale saliency maps wherein the likelihood computation is performed (in parallel) on linearly scaled versions of the input image:

$$S(i,j,k;\omega) = \hat{P}(x^{ijk}|\Omega) \quad (15)$$

where $x^{ijk}$ is the vector obtained from a local subimage of the input image in the multiscale representation. The ML estimate of the spatial position and scale of the object Ω is obtained as follows:

$$(i,j,k)^{ML}=\arg\max S(i,j,k;\omega) \quad (16)$$

where i, j identify an image component and k is the scale level.

Variability in the gray-scale appearance of an object or feature commonly arises from lighting and contrast variations. As discussed in fuller detail below, it is possible to normalize for global illumination changes (as well as for the linear response characteristics of a particular camera) by normalizing each subimage x by its mean and standard deviation. This lighting normalization is ordinarily performed during training and input-image analysis.

2. Hardware Implementation

Figure 3:
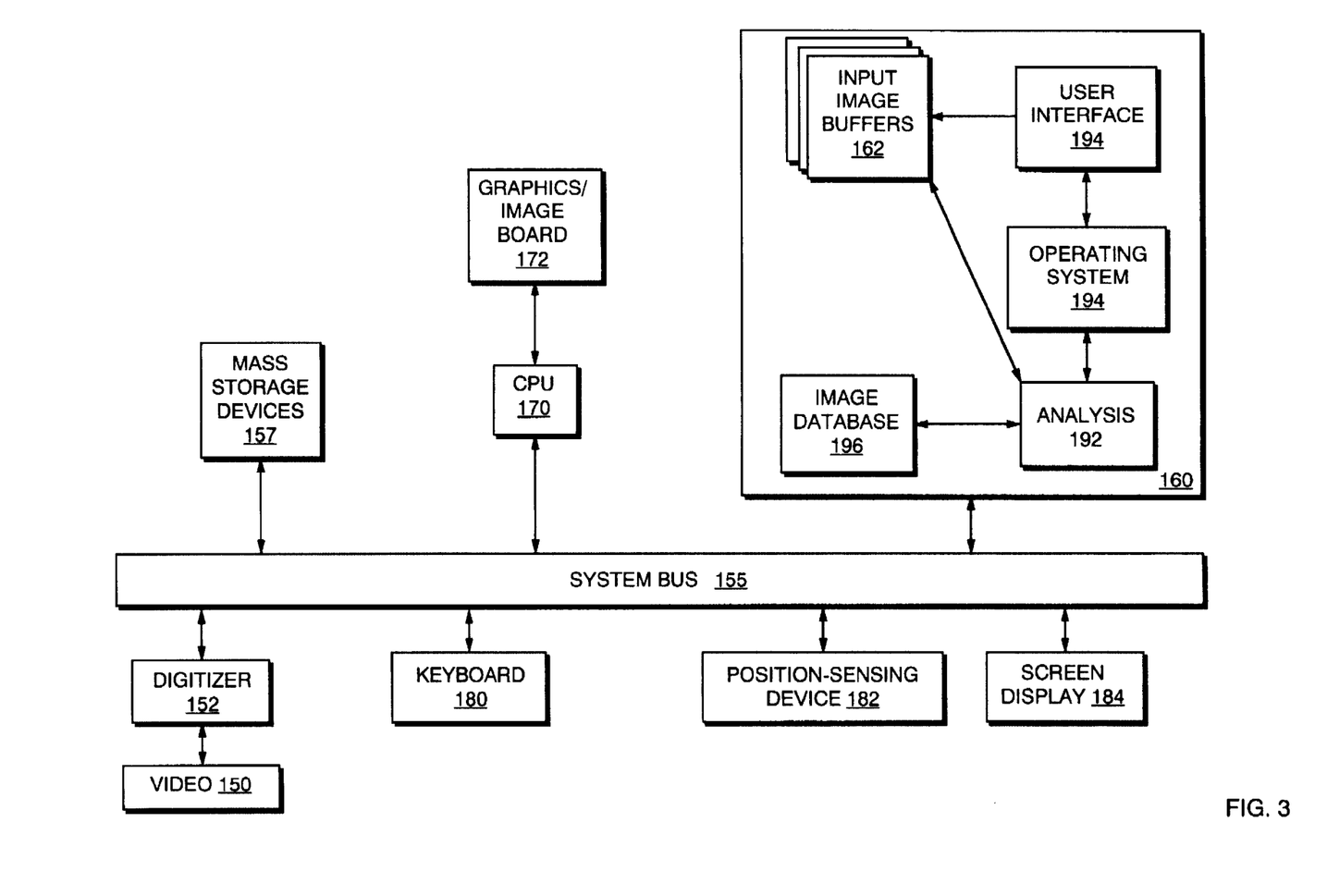
FIG. 3 schematically illustrates a representative hardware environment for the present invention.

Refer now to FIG. 3, which illustrates, in block-diagram form, a hardware system incorporating the invention. As indicated therein, the system includes a video source 150 (e.g., a charge-coupled device or "CCD" camera), which supplies a still input image to be analyzed. The output of video source 150 is digitized as a frame into a pixelmap by a digitizer 152. The digitized video frames are sent as bitstreams on a system bus 155, over which all system components communicate, and may be stored in a mass storage device (such as a hard disk or optical storage unit) 157 as well as in a main system memory 160 (specifically, within a partition defining a series of identically sized input image buffers 162).

The operation of the illustrated system is directed by a central-processing unit ("CPU") 170. To facilitate rapid execution of the image-processing operations hereinafter described, the system preferably contains a graphics or image-processing board 172; this is a standard component well-known to those skilled in the art.

The user interacts with the system using a keyboard 180 and a position-sensing device (e.g., a mouse) 182. The output of either device can be used to designate information or select particular areas of a screen display 184 to direct functions to be performed by the system.

The main memory 160 contains a group of modules that control the operation of CPU 170 and its interaction with the other hardware components. An operating system 190 directs the execution of low-level, basic system functions such as memory allocation, file management and operation of mass storage devices 157. At a higher level, an analysis module 192, implemented as a series of stored instructions, directs execution of the primary functions performed by the invention, as discussed below: and instructions defining a user interface 194 allow straightforward interaction over screen display 184. User interface 194 generates words or graphical images on display 184 to prompt action by the user, and accepts user commands from keyboard 180 and/or position-sensing device. Finally, memory 160 includes a partition 196 for storing an image database of objects or features encoded as described above with respect to eigentemplates stored in a device 157.

The contents of each image buffer 162 define a "raster," i.e., a regular two-dimensional pattern of discrete pixel positions that collectively represent an image and may be used to drive (e.g., by means of image-processing board 172 or an image server) screen display 184 to display that image. The content of each memory location in a frame buffer directly governs the appearance of a corresponding pixel on display 184.

It must be understood that although the modules of main memory 160 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention is directed by analysis module 192, which governs the operation of CPU 170 and controls its interaction with main memory 160 in performing the steps necessary to detect, recognize and encode objects or features. The components of a preferred implementation of this module appear in FIG. 4. The illustrated analysis module 192 operates at both the object and feature levels for maximum estimation accuracy; however, while these functions demonstrate the full, capabilities of the invention, it should be understood that the invention can alternatively operate at either the object or feature level rather than both (e.g., to conserve computational resources or to facilitate real-time operation).

Figure 4:
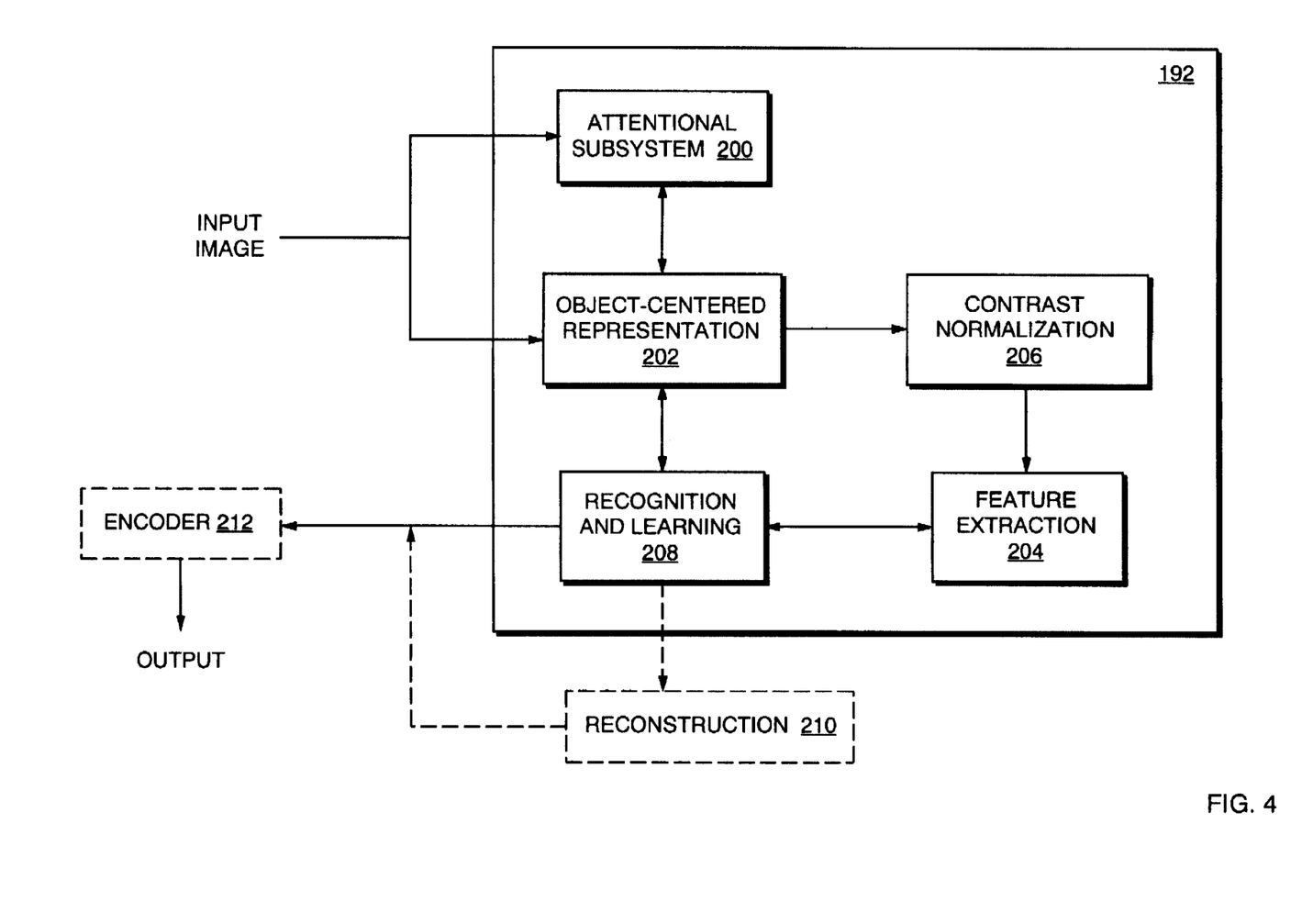
FIG. 4 illustrates, in block-diagram form, the analysis module in greater detail.

As shown in FIG. 4, an attentional subsystem 200 and an object-centered representation stage ("OCRS") 202 cooperate to perform a multiscale search on an input image to detect possible instances of an object; for explanatory purposes, this object is assumed to be a face. A key application of the invention arises at the detection stage: the ML analysis is used to determine whether an input image contains a face at all.

Figure 5:
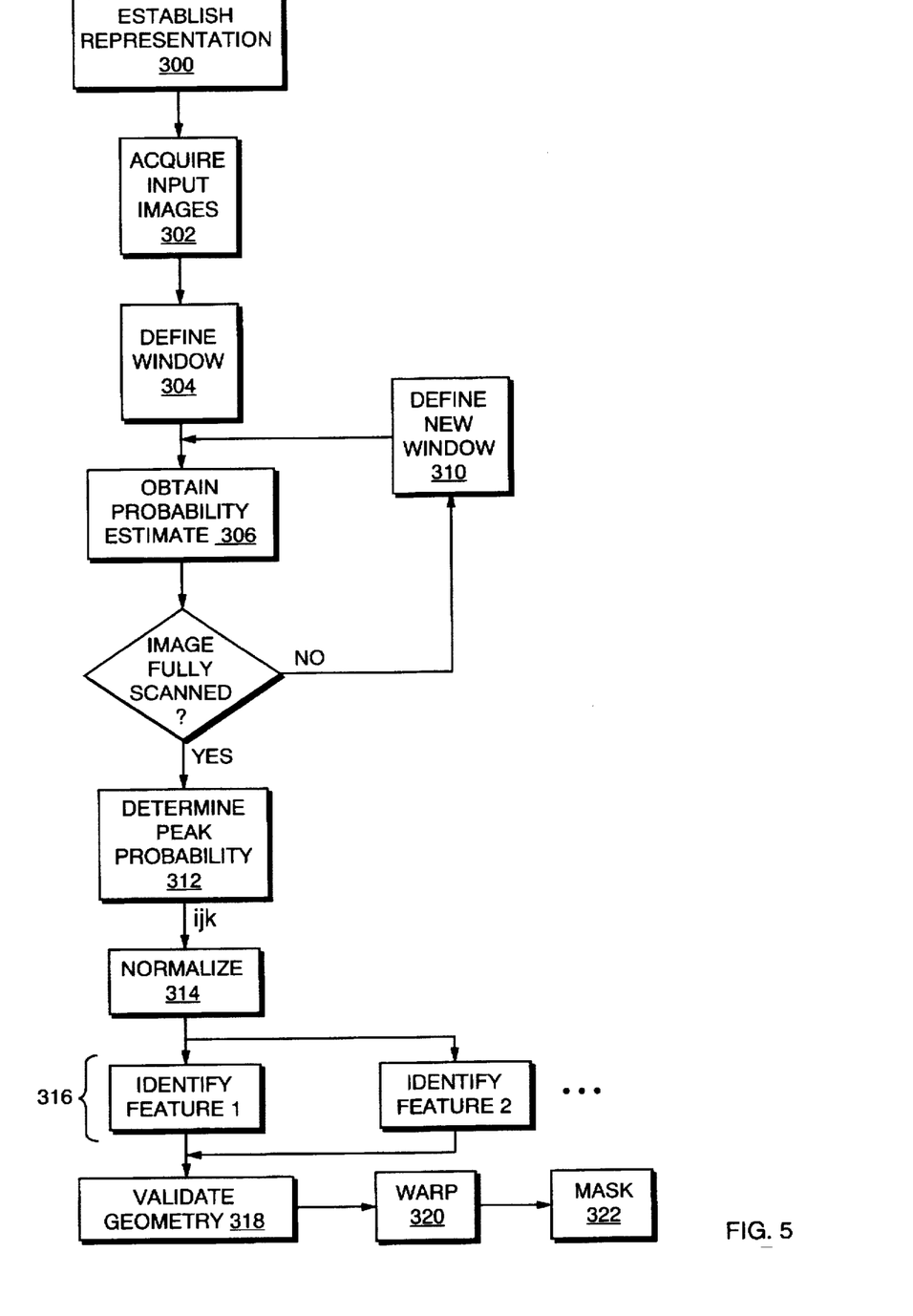
FIG. 5 is a flow chart depicting operation of the attentional subsystem and object-centered representation components of the analysis module.

The preferred mode of operation of subsystem 200 and OCRS 202 is shown in FIG. 5. In a first step 300, a coarse eigenvector face representation (e.g., having a 10-dimensional principal subspace—that is, a "face space" composed of the 10 "eigenface" eigenvectors having the highest associated eigenvalues) and eigenvector representations of various facial features (e.g., eyes, nose and mouth) are established from a series of training images (preferably generated at a single viewing angle). In response to an appropriate user command, the input image is loaded into a first buffer 162 in step 302, making it available to analysis module 192. The input image is then linearly scaled to a plurality of levels (e.g., ½ X, ¼ X, etc.) smaller than the input image, and each of the k scaled images is stored in a different one of image buffers 162.

In step 304, a rectangular "window" region of each scaled input image (e.g., 20×30 pixels) is defined, ordinarily at a corner of the image. The pixels within the window are vectorized as points in image space and projected onto the principal subspace F and the orthogonal subspace $\bar{F}$ to obtain a probability estimate, in accordance with Eqs. 8 and 11, in step 306. Unless the image has been fully scanned (step 308), the window is "moved" (step 310) by defining a new region of the same window size but displaced a distance of one pixel from the already-analyzed window. When an edge of the input image is reached, the window is moved perpendicularly by a distance of one pixel, and scanning resumes in the opposite direction. At the completion of image scanning, the window having the highest probability of containing a face is identified pursuant to Eq. 16 (step 312). Steps 304–312 are repeated for all scales k, thereby generating multiscale saliency maps.

Attentional subsystem 200 can, if desired, be configured to prefilter an input image in any number of suitable ways. For example, as discussed in the '992 patent, motion detection can be used to identify the presence of a person within a scene, and template-matching analysis of the located person's image used to predict the likely location of the face.

Following analysis of all scaled images, the window i,j having the highest associated probability estimate and its associated scale k is identified and normalized for translation and scale (step 314). Standard image-manipulation techniques are utilized to place the detected face in a bounding box. In step 316, the image in the bounding box is scanned to detect the locations of facial features (e.g., eyes, nose and mouth). Once again, this is accomplished by local-window movement and probability estimation against the eigenfeature vestors. The locations of these features in the bounding box are used first to validate the geometry of the detected face and then to "warp," i.e., geometrically transform the face so that it is spatially aligned with the view utilized in the training set for purposes of recognition, in step 320.

Finally, in step 322, the bounded image is masked so as to include only the interior of the face, thereby concentrating the descriptive power of the KLT on the most salient facial components. The training step 300 is performed by a feature-extraction module ("FEM") 204; steps 314–320 are carried out by OCRS 202; and the remaining steps, which involve projection of the input image onto the principal and orthogonal subspaces, are carried out by attentional subsystem 200.

A contrast-normalization module 206 processes the centered, masked face to compensate for variations in the input imagery arising from global illumination changes and/or the linear response characteristics of a particular CCD camera; these variations would affect both recognition and coding accuracy. Module 206 operates by normalizing the gray-scale range of the input image to a standard range (i.e., the range associated with the training images, which may themselves be normalized to a fixed standard by module 206). The normalization coefficients employed in contrast adjustment may be stored in memory to permit later reconstruction of the image with the original contrast.

Following contrast normalization, the face is processed by FEM 204, which projects the face vector onto a set of eigenfaces for purposes of recognition, i.e., matching the face to one of the training images. This step may be carried out, for example, in accordance with the '992 patent, in which case the eigenfaces represent the principal components and define space F. A recognition and learning module ("RLM") 208 utilizes the resulting projection coefficients to locate the face from image database 196, in which faces are represented by their own projection coefficients. RLM 208 returns the closest face from database 196 and a confidence level for the match.

The original image may be reconstructed from the adjusted image used for recognition purposes by a reconstruction module 210, which accumulates the normalization and transformation parameters used in steps 314 and 318, as well as the contrast adjustments used by module 206, and inversely applies these to arrive at the face as presented in the original input image.

The adjusted face image (and/or the reconstructed face and/or the input image, processed by FEM 204 into projection coefficients) can be encoded by an encoder module 212 for maximum efficiency in representation; this is particularly important, for example, if the image is to be transmitted or broadcast. While the projection coefficients themselves represent a considerable compression of a pixmap image, encoder 212 compresses them still further by normalizing the coefficients by their standard deviations (the square-roots of the eigenvalues computed by the KLT) and quantizing the normalized coefficients. Quantizing can be accomplished, for example, using a Lloyd-Max quantizer for a Gaussian source, which assigns the normalized coefficients into discrete range "bins"; each bin can be represented by a smaller amount of information than the corresponding floating-point coefficient, and the number of bins (i.e., quantization levels) determines the fineness of the quantized encoding. Naturally, fewer levels mean poorer image fidelity when the encoded image is reconstructed from the eigenfaces. However, by ranking the projection coefficients according to eigenvalue, which reflects the degree to which the associated eigenface contributes to the image and hence the importance of the coefficient, it is possible to preserve fidelity with minimal storage cost by utilizing a variable number of quantization levels for different coefficients (e.g., making the number of levels allocated to a given coefficient proportional to its eigenvalue).

As stated previously, it must be emphasized that the approach of the present invention is useful at the object or feature level. These can be combined, as discussed above, or performed separately depending on the particular application. For example, the invention can "look past" the multifeatured entity represented by a face to locate specific facial features; if the searched object feature embodies particularly identifiable characteristics, a feature-specific search can prove both more accurate and in some cases faster than an whole-object search.

The eigenspace density estimation technique of the present invention is not limited to textured or detailed objects such as faces. For example, we have successfully applied the technique to essentially textureless objects such as hands, whose variability arises from shape rather than texture. By utilizing an edge-based representation of hand shapes, which is invariant with respect to illumination, contrast and scene background, we have demonstrated the ability of the invention to operate on object identities represented purely as gestural forms.

In this implementation, we first digitally captured a training set of hand gestures against black background. The two-dimensional contour of the hand was then extracted using a Canny edge operator. The resulting binary edge maps were highly uncorrelated with one another, however, due to their sparse distribution, leading to a very high-dimensional principal subspace. To reduce the intrinsic dimensionality, we induced spatial correlation through a diffusion process on the binary edge maps; this process effectively broadens and "smears" the edges, yielding a continuously valued contour image that represents the object shape in terms of a spatial distribution of edges. This representation reduced the principal subspace to a computationally tractable level, such that the recognition approach disclosed in the '992 patent assigned gestural classifications to input hand gestures (that were preprocessed to generated diffused edge maps) with high accuracy in a 16-dimensional principal subspace.

The invention was applied to this environment at the detection (attentional and representational) stage, i.e., to find a hand (in any of its articulated States) in a cluttered scene, to account for its scale and to align it with respect to a reference frame prior to recognition. This localization was achieved with the System described above, with the exception that the underlying image representation of the hands was the diffused edge map instead of a gray-scale image.

In this case, however, the distribution of training data was multimodal due to the fundamentally different hand shapes for each gesture. Therefore, attentional subsystem utilized the approach discussed in connection with Eqs. 12–14 above rather than Eqs. 8 and 11; the parameters of this estimate were obtained with 20 iterations of the EM algorithm. Each input scene was first preprocessed to generate a diffused edge map and then scaled as discussed above to facilitate multiscale saliency computation. The invention was found to detect and localize hands in images containing cluttered background scenes with substantial accuracy.

It will therefore be seen that the foregoing represents a highly extensible and advantageous approach to detection, recognition and encoding of objects and features thereof. The terms and expressions employed herein are used as terms of description and not of limitation, and there is no intention, in the use of such terms and expressions, of excluding any equivalents of the features shown and described or portions thereof, but it is recognized that various modifications are possible Within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method for detecting selected features in digitally represented input images, the method comprising the steps of:
   a. representing a training set of instances of the selected feature as a set of eigenvectors in a multidimensional image space;
   b. representing portions of the input image as input vectors in the image space;
   c. performing a density-estimation analysis on the input vectors to estimate, for each input vector, a probability level indicative of the likelihood that the input vector corresponds to an image portion containing an instance of the selected feature, wherein said density estimation analysis is based on all vector components; and
   d. identifying image portions having the highest associated probability levels.

2. The method of claim 1 wherein the step of performing a density-estimation analysis comprises the steps of:
   a. dividing the image space into a principal subspace and an orthogonal subspace, the principal subspace including a unimodal set of principal eigenvectors;
   b. computing the distance between a point identified by an input vector and the principal subspace;
   c. projecting the input vector onto the principal subspace;
   d. computing the probability distribution of the input-vector projection with respect to the principal eigenvectors; and
   e. estimating, from the computed distance and the computed probability distribution, the probability level indicative of the likelihood that the input vector corresponds to an image portion containing an instance of the selected feature.

3. The method of claim 2 wherein the estimating step comprises computing a first marginal probability density in the principal subspace and a second marginal probability density in the orthogonal subspace, the first density being a true density, the second density being an estimated density and the first and second densities being statistically consistent with one another, and multiplying the first and second densities.

4. The method of claim 1 wherein the step of performing a density-estimation analysis comprises the steps of:
   a. dividing the image space into a principal subspace and an orthogonal subspace, the principal subspace including a multimodal set of principal eigenvectors;
   b. computing the distance between a point identified by an input vector and the principal subspace;
   c. projecting the input vector onto the principal subspace;
   d. computing the probability distribution of the input-vector projection with respect to the principal eigenvectors using a parametric mixture model; and
   e. estimating, from the computed distance and the computed probability distribution, the probability level indicative of the likelihood that the input vector corresponds to an image portion containing an instance of the selected feature.

5. The method of claim 1 further comprising a recognition step of determining, for each identified image portion, which one, if any, of a reference set of digitally represented instances of the selected feature the instance contained in the identified image portion resembles.

6. The method of claim 5 wherein the reference set of digitally represented instances is represented by a plurality of vectors in the principal subspace and the recognition step comprises projecting the input vector onto the principal subspace and locating the instance vector closest thereto.

7. The method of claim 1 further comprising the step of encoding each identified image portion as a set of quantized projection coefficients.

8. The method of claim 1 wherein the selected features are faces.

9. The method of claim 1 wherein the selected features are facial features.

10. An apparatus for detecting selected features in digitally represented input images comprising:
    a. a computer memory for storing the input images;
    b. means for representing a training set of instances of the selected feature as a set of eigenvectors in a multidimensional image space;
    c. means for isolating at least a portion of the stored input image and representing it as an input vector in the image space; and
    d. image processing means for performing a density-estimation analysis and analyzing an input vector to estimate, for each input vector, a probability level indicative of the likelihood that the input vector corresponds to an image portion containing an instance of the selected feature, wherein said density estimation analysis is based on all vector components.

11. The apparatus of claim 10 wherein each input is represented as a plurality of pixels, and further comprising:
    a. means for representing the input image at a plurality of scales;
    b. means for defining, for each scaled image, a window including a fixed number of pixels of the image, and transferring the contents of each window to the image-processing means to generate a probability level for each window; and
    c. means for identifying the window having the highest associated probability.

12. The apparatus of claim 10 wherein the image-processing means is configured to:
    a. divide the image space into a principal subspace and an orthogonal subspace, the principal subspace including a unimodal set of principal eigenvectors;
    b. compute the distance between a point identified by an input vector and the principal subspace;
    c. project the input vector onto the principal subspace;
    d. compute the probability distribution of the input-vector projection with respect to the principal eigenvectors; and e. estimate, from the computed distance and the computed probability distribution, the probability level indicative of the likelihood that the input vector corresponds to an image portion containing an instance of the selected feature.

13. The apparatus of claim 12 wherein the image-processing means estimates the probability level using maximum-likelihood analysis.

14. The apparatus of claim 10 further comprising means for identifying, based on probability level, at least one input vector likely to contain an instance of the selected feature.

15. The apparatus of claim 14 wherein the training set of feature instances are generated at a single viewing angle, and further comprising means for isolating and processing the input-image portion corresponding to each identified input vector, said means comprising:

a. means for normalizing the input-image portion with respect to translation and scale;

b. means for identifying a plurality of subfeatures in the input-image portion;

c. validation means for analyzing identified subfeatures for geometric consistency with a stored template;

d. warping means for spatially aligning validated input-image portions for consistency with the viewing angle; and e. masking means for deleting those portions of the input image that do not correspond to the feature.

16. The apparatus of claim 15 further comprising contrast-normalization means for processing the masked image to compensate for variations in contrast.

17. The apparatus of claim 15 further comprising:

a. a database for storing each of the training images as a set of projection coefficients onto a set of eigenvectors;

b. identification means comprising (i) means for projecting the masked image onto the set of eigenvectors to obtain a set of input projection coefficients, and (ii) means for locating the training image whose projection coefficients most closely match the input projection coefficients.

18. The apparatus of claim 17 wherein the identification means includes means for computing a confidence level indicative of the degree to which the coefficients of the selected training image match the coefficients of the input projection.

19. The apparatus of claim 15 further comprising a reconstruction module for reconstructing the input image from the isolated and processed input-image portion.

20. The apparatus of claim 15 further comprising an encoder module that itself comprises:

a. means for projecting the masked image onto a set of eigenvectors to obtain a set of input projection coefficients; and b. means for quantizing the input projection coefficients.

\* \* \* \* \*